United States Patent
Sanjeev et al.

(10) Patent No.: US 10,630,731 B2
(45) Date of Patent: Apr. 21, 2020

(54) ESTABLISHING MEDIA SESSIONS VIA MQTT AND SIP

(71) Applicant: Verizon Patent and Licensing Inc., Arlington, VA (US)

(72) Inventors: Kumar Sanjeev, San Ramon, CA (US); Dongliang Hu, Dublin, CA (US)

(73) Assignee: Verizon Patent And Licensing Inc., Basking Ridge, NJ (US)

( * ) Notice: Subject to any disclaimer, the term of this patent is extended or adjusted under 35 U.S.C. 154(b) by 675 days.

(21) Appl. No.: 14/878,251

(22) Filed: Oct. 8, 2015

(65) Prior Publication Data
US 2017/0104792 A1    Apr. 13, 2017

(51) Int. Cl.
*H04L 29/06*    (2006.01)
*H04W 80/10*    (2009.01)

(52) U.S. Cl.
CPC ........ *H04L 65/1069* (2013.01); *H04L 65/105* (2013.01); *H04L 65/1006* (2013.01); *H04W 80/10* (2013.01)

(58) Field of Classification Search
USPC ................................. 709/227–229, 231, 237
See application file for complete search history.

(56) References Cited

U.S. PATENT DOCUMENTS

| | | | |
|---|---|---|---|
| 2005/0021622 A1* | 1/2005 | Cullen ................... | G06Q 30/02 709/204 |
| 2011/0150203 A1* | 6/2011 | Stille .................. | H04M 3/42017 379/207.16 |
| 2014/0100961 A1* | 4/2014 | Lee ..................... | G06Q 30/0267 705/14.64 |
| 2015/0312179 A1* | 10/2015 | Ben-Ezra .............. | H04L 51/043 709/203 |

OTHER PUBLICATIONS

Rosenberg et. al., "SIP: Session Initiation Protocol," RFC 3261, Jun. 2002.
MQTT Version 3.1.1 OASIS Standard Specification, Oct. 29, 2014.

* cited by examiner

*Primary Examiner* — Younes Naji
*Assistant Examiner* — Da T Ton

(57) ABSTRACT

A method of establishing a media session between first and second mobile stations, the method including receiving, at an MQTT messaging service and from the first mobile station, a first MQTT subscription request and a first MQTT application message; issuing, in response to receiving the first MQTT application message, an indication to the second mobile station that a mobile station requests establishing a media session with the second mobile station; receiving, at the MQTT messaging service and from the second mobile station, a second MQTT application message; forwarding the second MQTT application message to the first mobile station; receiving a SIP INVITE message issued by one of the first and second mobile stations; forwarding the SIP INVITE message the other of the first and second mobile stations; receiving a SIP OK message issued by the one mobile station; and forwarding the SIP OK message to the other mobile station.

20 Claims, 6 Drawing Sheets

ESTABLISHING MEDIA SESSIONS VIA MQTT AND SIP

BACKGROUND

Session Initiation Protocol (SIP) is an application-layer protocol for creating, modifying, and terminating media sessions, such as voice and/or video calls, between participant systems. The SIP protocol is detailed in Rosenberg et. al., "SIP: Session Initiation Protocol," RFC 3261, June 2002, a copy of which is filed concurrently with this application, and is incorporated by reference in its entirety. Various hardware and software products are available which allow mobile stations, such as smartphones, to use SIP to enable media sessions. For example, a number of devices running the Android operating system, and various applications for smartphone devices, provide such features.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
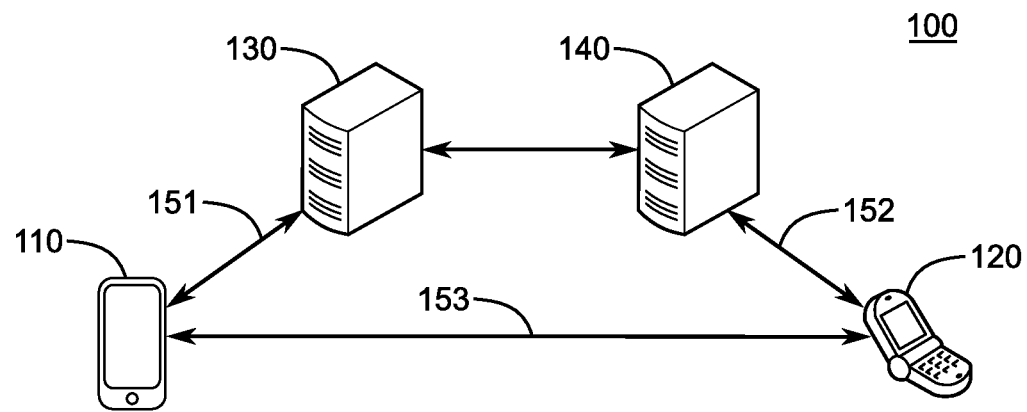
FIG. 1 illustrates an example of a conventional system for using SIP to establish a media session between two mobile stations.

FIG. 1 illustrates an example of a conventional system 100 for using SIP to establish a media session between two mobile stations 110 and 120. Mobile station 110 utilizes SIP proxy 130 to establish media sessions. Mobile station 120 utilizes SIP proxy 140 to establish media sessions. Mobile station 110 must keep alive a TCP- or UDP-based SIP channel 151 with its SIP proxy 130 in order to listen for incoming requests for media sessions, such as a VOIP voice call. Likewise, mobile station 120 must keep alive a TCP- or UDP-based SIP channel 152 with its SIP proxy 140 in order to listen for incoming requests for media sessions, such as a VOIP voice call. In an implementation in which UDP is used for channel 151 or channel 152, the respective mobile station 110 or mobile station 120 may keep its IP address and port number open to the public if they are open to the internet (not behind a NAT), or use STUN technology to create a "pinhole" to the NAT, as discussed in in Boulton et. al., "NAT Traversal Practices for Client-Server SIP," RFC 6314, July 2011, which is incorporated by reference in its entirety. In a SIP dialog between mobile stations 110 and 120 conducted via SIP proxies 130 and 140, mobile stations 110 and 120 exchange information needed to establish a direct network connection 153 for conducting a media session between mobile stations 110 and 120.

Figure 2:
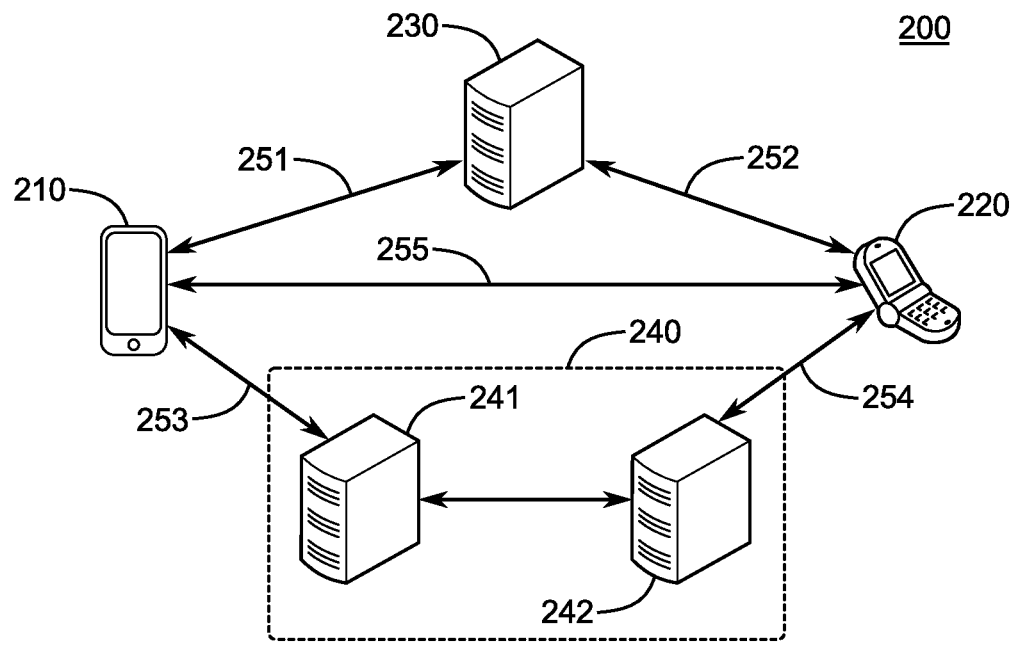
FIG. 2 illustrates an example of a system utilizing both MQTT and SIP for establishing a media session between two mobile stations.

FIG. 2 illustrates an example of a system 200 utilizing both MQTT and SIP for establishing a media session between two mobile stations 210 and 220. Mobile stations 210 and 220 are examples of mobile stations that may be used for data services via a single or separate mobile communication networks. Although FIG. 2 only illustrates two mobile stations 210 and 220, the mobile communication networks will provide similar communications for many other similar users as well as for mobile stations/users that do not participate in the data services. The techniques described herein may be implemented in any of a variety of available mobile communication networks and/or on any type of mobile station compatible with such networks, and the drawing illustrates only a very simplified example of a few relevant elements for purposes of the discussion herein. Although FIG. 2 illustrates the use of two mobile stations 210 and 220, other types of communication devices, beside mobile stations, may be used in accordance with the techniques described in this application. However, reductions in power consumption for such communication devices may be of less interest, such as where a communication device utilizes AC mains power.

System 200 includes SIP service 240. In the particular example illustrated in FIG. 2, SIP service 240 includes SIP proxy 241 for mobile station 210 and SIP proxy 242 for mobile station 220. However, in some implementations, such as where mobile stations 210 and 220 utilize the same wireless communication network, a single SIP proxy may be effective for completing the process of establishing a media session between mobile stations 210 and 220. In some implementations, SIP service 240 may be omitted, and mobile stations 210 and 220 may initiate a SIP dialog directly with each other. In such implementations, authentication and authorization functions may be provided via MQTT messaging service 230.

Although in the example illustrated in FIG. 2, mobile stations 210 and 220 do utilize SIP service 240, instead of maintaining TCP- or UDP-based SIP channels 253 and 254 with SIP service 240 in an active or connected state to receive notifications of requested media sessions, mobile stations 210 and 220 are both configured to utilize MQTT messaging service 230 to perform the initial mediation of establishing a media session. MQTT is a lightweight publish/subscribe messaging protocol initially designed for constrained devices and low-bandwidth, high-latency, or unreliable networks. MQTT is detailed in the MQTT Version 3.1.1 OASIS Standard Specification, Oct. 29, 2014, a copy of which is filed concurrently with this application, and is incorporated by reference in its entirety. Once the initial mediation has been completed via MQTT, only then do mobile stations 210 and 220 proceed with establishing respective TCP- or UDP-based SIP channels 253 and 254. In a SIP dialog between mobile stations 210 and 220 conducted via SIP service 240, mobile stations 210 and 220 exchange information needed to establish a network connection 255 between mobile stations 210 and 220 for conducting a media session. In some examples, network connection 255 may include one or more media relay servers (not illustrated) to traverse firewalls between mobile stations 210 and 220.

Figure 3:
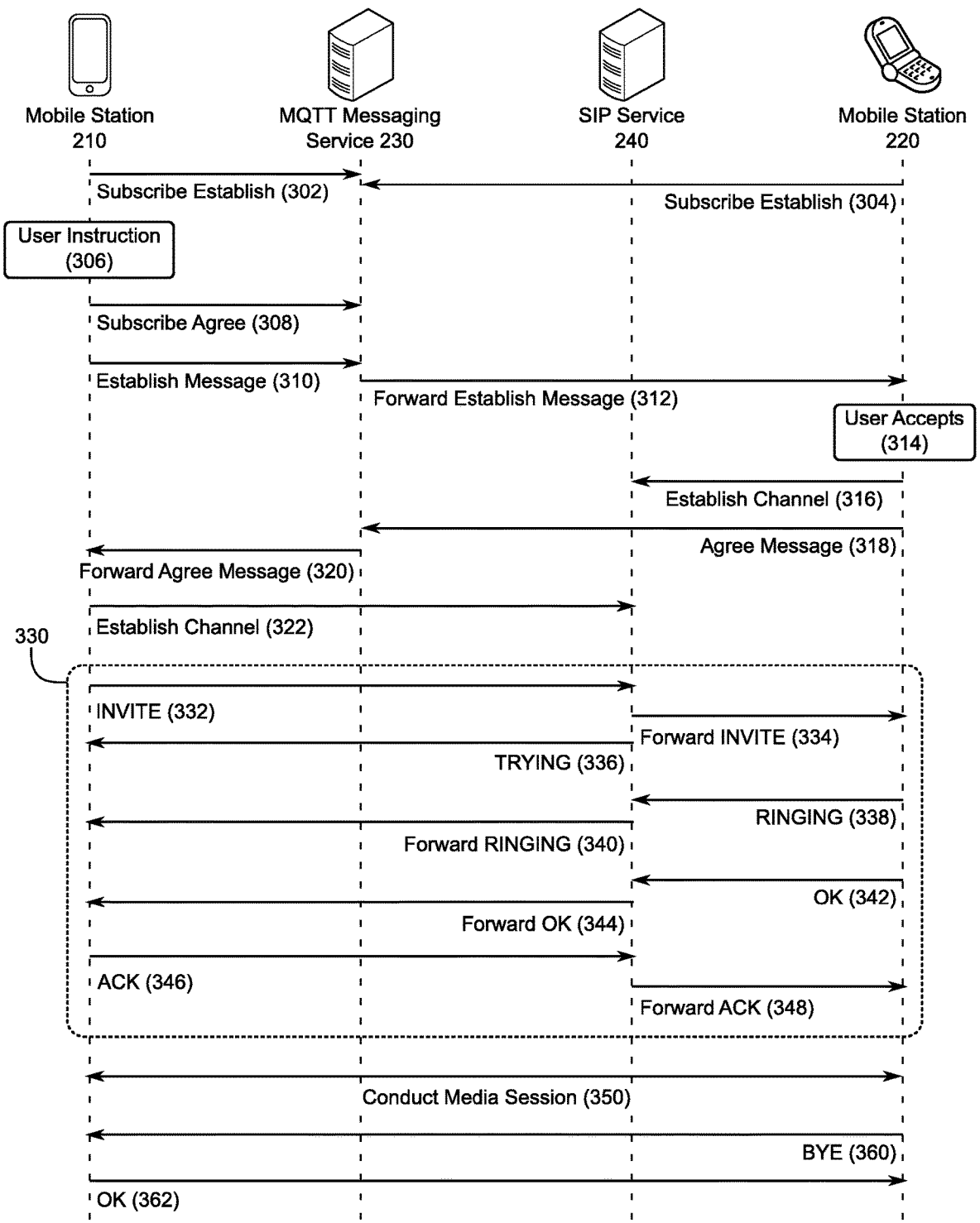
FIG. 3 illustrates an example of establishing a media session between a first mobile station and a second mobile station.

FIG. 3 illustrates an example of establishing a media session between a first mobile station 210 and a second mobile station 220. Although not illustrated in FIG. 3, prior to 302, mobile station 210 opens a TCP connection with MQTT messaging service 230, and sends an MQTT CONNECT packet to MQTT messaging service 230 to request an MQTT connection with MQTT messaging service 230. The MQTT CONNECT packet may include, for example, a username and/or password, which may be used to identify and/or authenticate the mobile station 210 with MQTT messaging service 230. In some implementations, the MQTT CONNECT packet may also include a proposed client identifier string for mobile station 210. In such implementations, MQTT messaging service 230 may be configured to refuse a MQTT CONNECT packet in response to the identifier not being unique. For the examples illustrated in FIGS. 3-5, the client identifier for the mobile station 210 will be "MS210." In response to the MQTT CONNECT packet, MQTT messaging service 230 sends back an MQTT CONNACK packet. In much the same manner, mobile station 220 requests an MQTT connection with MQTT messaging service 230. For the examples illustrated in FIGS. 3-5, the client identifier for the mobile station 220 will be "MS220." The client identifiers should be assigned to, or generated by, the mobile stations in a manner that a mobile station can automatically determine a client identifier for another mobile station.

At 302, the mobile station 210 transmits a subscription request to MQTT messaging service 230 for a first topic name used to indicate a mobile station requests establishing a media session with the mobile station 210. For example, the mobile station 210 may transmit an MQTT SUBSCRIBE packet to MQTT messaging service 230 for a first topic name "estabMS210"—a concatenation of an "estab" prefix with the "MS210" client identifier for mobile station 210. Once MQTT messaging service 230 accepts the subscription request, mobile station 210 will be prepared to receive incoming media session requests from other mobile stations via MQTT messaging service 230. Likewise, at 304, the second mobile station 220 transmits a subscription request to MQTT messaging service 230 for a second topic name used to indicate a mobile station requests establishing a media session with the second mobile station 220. For example, the second mobile station 220 may transmit an MQTT SUBSCRIBE packet to MQTT messaging service 230 for a second topic name "estabMS220"—a concatenation of an "estab" prefix with the "MS220" client identifier for mobile station 220. Once MQTT messaging service 230 accepts the subscription request, mobile station 220 will be prepared to receive incoming media session requests from other mobile stations via MQTT messaging service 230. In some implementations, if a mobile station supports media sessions of different types, for example, voice-only or video with voice, the mobile station may be configured to subscribe to separate topic names for each type, such as "estabVoiceMS210" and "estabVidconMS210."

At 306, a user of mobile station 210 issues a user instruction to mobile station 210 to establish a media session with mobile station 220. For example, a user interface may be provided on display 622 allowing the user to contact various parties. In some implementations, parties that will be contacted via MQTT messaging service 230 may be indistinguishable with other parties, with program code executing on mobile station 210 automatically identifying parties that may be reached via MQTT messaging service 230.

At 308, in response to the user instruction being obtained by mobile station 210, the mobile station 210 transmits a subscription request to MQTT messaging service 230 for a third topic name used to indicate a mobile station agrees to establish a media session with the mobile station 210. For example, the mobile station 210 may transmit an MQTT SUBSCRIBE packet to MQTT messaging service 230 for a third topic name "agreeMS210"—a concatenation of an "agree" prefix with the "MS210" client identifier for mobile station 210. In some implementations, the third topic name may be specific to this particular attempt by mobile station 210 to establish a media session with mobile station 220. For example, the third topic name might be "MS210agreeMS220" (which will be used hereafter as the example third topic name)—a concatenation of the "MS210" client identifier for mobile station 210, an "agree" string, and the "MS220" client identifier for mobile station 220.

At 310, also in response to the user instruction being obtained by mobile station 210, the mobile station 210 transmits an MQTT application message having the second topic name ("estabMS220", in this example) to MQTT messaging service 230. For example, the mobile station 210 may transmit an MQTT PUBLISH packet to MQTT messaging service 230 indicating the second topic name "estabMS220". The MQTT application message may include information identifying mobile station 210. Subsequent packets exchanged between mobile station 210 and MQTT messaging service 230 depend on the quality of service (QOS) level with which a particular implementation chooses to operate.

The order of 308 and 310 is generally not important, although the illustrated order avoids the agree message of 318 from being received by MQTT messaging service 230 before an appropriate subscription is in place.

At 312, in response to MQTT messaging service 230 receiving the MQTT application message at 310, MQTT messaging service 230 issues an indication to mobile station 220 that a mobile station requests establishing a media session with mobile station 220 by forwarding the MQTT application message it received at 310 to mobile station 220 in response to the subscription by mobile station 220 at 304 for the second topic name ("estabMS220", in this example). At this point, mobile station 220 has been notified that mobile station 210 is requesting to establish a media session with mobile station 220. Typically, mobile station 220 is configured to indicate to a user of mobile station 220 that a mobile station requests establishing a media session with mobile station 220, to permit the user to accept, refuse, and/or ignore the request. In some implementations, this may involve displaying a visual and/or textual identification of the mobile station 210 or a user of mobile station 210. In some implementations, mobile station 220 may provide and auditory or vibratory indication. In some implementations, a user interface and/or user input element may allow the user of mobile station 220 to expressly accept or refuse the request from mobile station 210. At 314, mobile station 220 obtains a user instruction from a user of mobile station 220 agreeing to establish the media session requested by mobile station 210.

At 316, in response to the user instruction obtained at 314, mobile station 220 establishes a SIP connection with SIP service 240 by, in part, establishing a TCP- or UDP-based SIP channel with SIP service 240 (see, for example, TCP- or UDP-based SIP channel 254 in FIG. 2). Prior to this point, including throughout operations 302-314 discussed above, mobile station 220 has not had a SIP channel established with SIP service 240. In some implementations, SIP service 240 may perform authentication and/or authorization of mobile station 220 establishing the media session. In some implementations, authentication and/or authorization can be processed on both MQTT messaging service 230 and SIP service 240, and MQTT messaging service 230 and SIP service 240 may share a common user profile database (not illustrated) for account validation and such.

At 318, also in response to the user instruction obtained at 314, the mobile station 220 transmits an MQTT application message having the third topic name ("MS210agreeMS220", in this example) to MQTT messaging service 230. For example, the mobile station 220 may transmit an MQTT PUBLISH packet to MQTT messaging service 230 indicating the third topic name "MS210agreeMS220". Subsequent packets exchanged between mobile station 220 and MQTT messaging service 230 depend on the quality of service (QOS) level with which a particular implementation chooses to operate. In some implementations, mobile station 220 may be configured to transmit an unsubscribe request to MQTT messaging service 230 for the second topic name, so as to not receive additional requests during its media session with mobile station 210; this unsubscribe request might be sent any time from operations 314-348. The order of 316 and 318 is generally not important. With the conclusion of operation 318, mobile station 220 needs no further communication with MQTT messaging service 230 to complete establishing a media session with mobile station 210, as SIP service 240 will be used for that purpose.

At 320, MQTT messaging service 230 forwards the MQTT application message it received at 318 to mobile station 210 in response to the subscription by mobile station 210 at 320 for the third topic name ("MS210agreeMS220", in this example). At this point, mobile station 210 has been notified that a mobile station (in some implementations, specifically mobile station 220) agrees to establish a media session with mobile station 210. Although not illustrated in FIG. 3, mobile station 210 may be configured to transmit an unsubscribe request to MQTT messaging service 230 for the third topic name, as it has been notified that mobile station 220 has accepted its request to establish a media session. In some implementations, mobile station 210 may be configured to transmit an unsubscribe request to MQTT messaging service 230 for the first topic name, so as to not receive requests to establish media sessions during its media session with mobile station 220; this unsubscribe request might be sent any time from operations 320-346. With the conclusion of operation 320, mobile station 210 needs no further communication with MQTT messaging service 230 to complete establishing a media session with mobile station 220, as SIP service 240 will be used for that purpose.

At 322, in response to the MQTT application message received at 320, mobile station 210 establishes a SIP connection with SIP service 240 by, in part, establishing a TCP- or UDP-based SIP channel with SIP service 240 (see, for example, TCP- or UDP-based SIP channel 253 in FIG. 2). Prior to this point, including throughout operations 302-320 discussed above, mobile station 210 has not had a SIP channel established with SIP service 240. In some implementations, SIP service 240 may perform authentication and/or authorization of mobile station 210 establishing the media session. In some implementations, authentication and/or authorization can be processed on both MQTT messaging service 230 and SIP service 240, and MQTT messaging service 230 and SIP service 240 may share a common user profile database (not illustrated) for account validation and such.

330 illustrates a possible exchange of SIP messages between mobile station 210, SIP service 240, and mobile station 220 to establish and conduct a SIP dialog, with 330 including operations 332-348. At 332, mobile station 210 transmits a SIP INVITE message to SIP service 240, which forwards the SIP INVITE message to mobile station 220 at 334. The SIP INVITE message may include, for example, information about mobile station 210, such as an address at which mobile station 220 may connect with mobile station 210, and information about the media session. At 336, in response to the SIP INVITE message received at 334, SIP service 240 may transmit a SIP TRYING message to indicate to mobile station 210 that SIP service 240 forwarded the SIP INVITE message to mobile station 220. At 338, in response to the SIP INVITE message received at 334, mobile station 220 may transmit a SIP RINGING message to SIP service 240, which forwards the SIP RINGING message to mobile station 210 at 340. However, in some implementations, the SIP RINGING message may be omitted due the user of mobile station 220 already having accepted the media session at 314. At 342, in response to the SIP INVITE message received at 334, mobile station 220 transmits a SIP OK message to SIP service 240, which forwards the SIP OK message to mobile station 210 at 344. The SIP OK message may include, for example, information about mobile station 220, such as an address at which mobile station 210 may connect with mobile station 220, and information about the media session. At 346, in response to the SIP OK message received at 344, mobile station transmits a SIP ACK message to SIP service 240, which forwards the SIP ACK message to mobile station 220 at 348.

FIG. 3 illustrates an example in which, in 330, mobile station 210 transits the initial SIP INVITE message at 332. However, in some implementations or circumstances, mobile station 220 may transmit the initial SIP INVITE message and transmit and receive the SIP messages in 330 for mobile station 210 (in other words, transmit the SIP INVITE message at 332, receive the SIP TRYING message at 336, receive the SIP RINGING message at 340, receive the OK message at 344, and transmit the SIP ACK message at 346), and mobile station 210 may transmit and receive the SIP messages described above in 330 for mobile station 220 (in other words, receive the SIP INVITE message at 334, transmit the SIP RINGING message at 338, transmit the SIP OK message at 342, and receive the SIP ACK message at 348).

At 350, with the exchange of SIP messages in 330 complete, mobile stations 210 and 220 contact each other directly, or via media relay servers if needed, to perform the media session. In the example illustrated in FIG. 3, the media session is concluded via SIP messaging. At 360, mobile station 220 (although, the message could also be sent by mobile station 210) issues a SIP BYE message to mobile station 210. At 362, in response to the BYE message, mobile station 210 issues a SIP OK message to mobile station 220, which concludes the communication session between mobile stations 210 and 220.

Although FIG. 3 illustrates an example in which mobile station 210 initiates a media session and mobile station 220 accepts the media session, these roles may be reversed, and mobile station 210 may further be configured to perform the operations discussed above with respect to mobile station 220 (for example, operations 314, 316, 318, 338, 342, 350, and 360). In some implementations, communication with MQTT messaging service 230 may be performed by a first application program, and communication with SIP service 240 may be performed by a second application program. In such implementations, existing SIP software may be used with little or no modification as or to provide the second application program. This allows standardized and well-tested SIP-based software to be used for the latter portion of the operations illustrated in FIG. 3.

Figure 4:
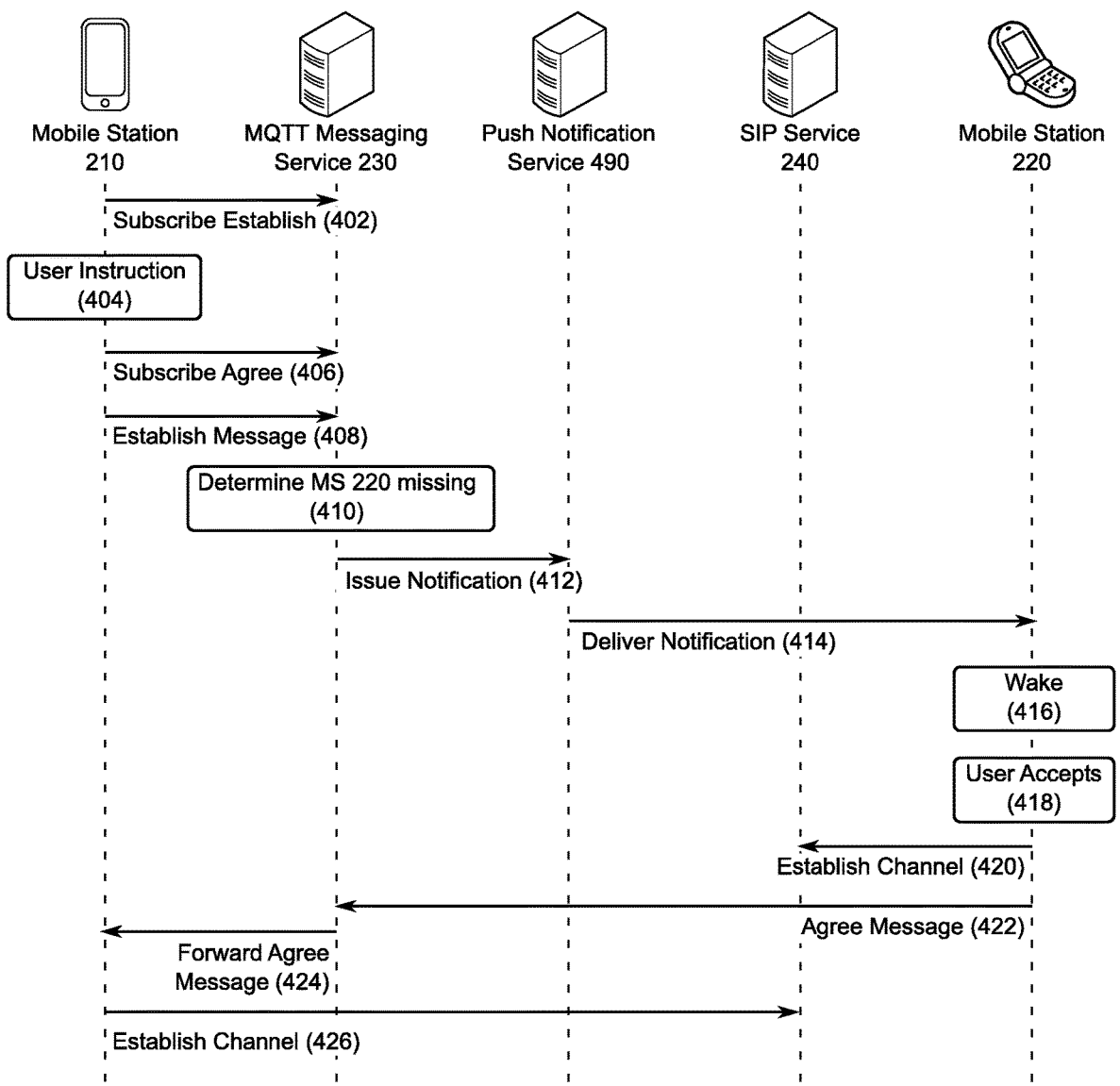
FIG. 4 illustrates an example of establishing a media session between a first mobile station and a second mobile station with the assistance of a push notification to the second mobile station.

FIG. 4 illustrates an example of establishing a media session between a first mobile station 210 and a second mobile station 220 with the assistance of a push notification to the second mobile station 220. Operations 402, 404, 406, and 408 by mobile station 210 proceed much as discussed with respect to respective operations 302, 306, 308, and 310 in FIG. 3. However, in the example illustrated in FIG. 4, mobile station 220 has not connected to MQTT messaging service 230 and/or did not subscribe with the MQTT messaging service 230 for a topic name used to indicate a mobile station requests establishing a media session with mobile station 220 (in contrast to the example of FIG. 3, in which this was done at 304).

At 410, in response to MQTT messaging service 230 receiving the MQTT application message at 408, MQTT messaging service 230 determines that mobile station 220 has not connected to MQTT messaging service 230 or did not subscribe with the MQTT messaging service 230 for a topic name used to indicate a mobile station requests establishing a media session with mobile station 220. At 412, in response to the determination made at 410, MQTT messaging service 230 issues an indication to mobile station 220 that a mobile station requests establishing a media session with mobile station 220 by issuing a push notification, indicating that a mobile station requests establishing a media session with mobile station 220, to push notification service 490. Examples of push notification service 490 include, but are not limited to, the Apple Push Notification service (APNs) for iOS devices, and the Google Cloud Messaging (GCM) service for Android devices. The push notification includes a payload portion, in which MQTT messaging service may identify mobile station 210 as the requesting mobile station. At 414, push notification service 490 delivers the push notification to mobile station 220.

At 416, in response to receiving the push notification delivered at 414, mobile station 220 is awakened from a sleep state, or an application program on mobile station 220 is awakened, started, or restarted to process the push notification. From that point, operations 416, 418, 420, 422, 424, and 426 proceed in much the same manner as respective operations 314, 316, 318, 320, and 322 in FIG. 3, and establishing and operating a media session via SIP service 240 proceeds in much the same manner discussed with respect to operations 332-362 in FIG. 3.

Figure 5:
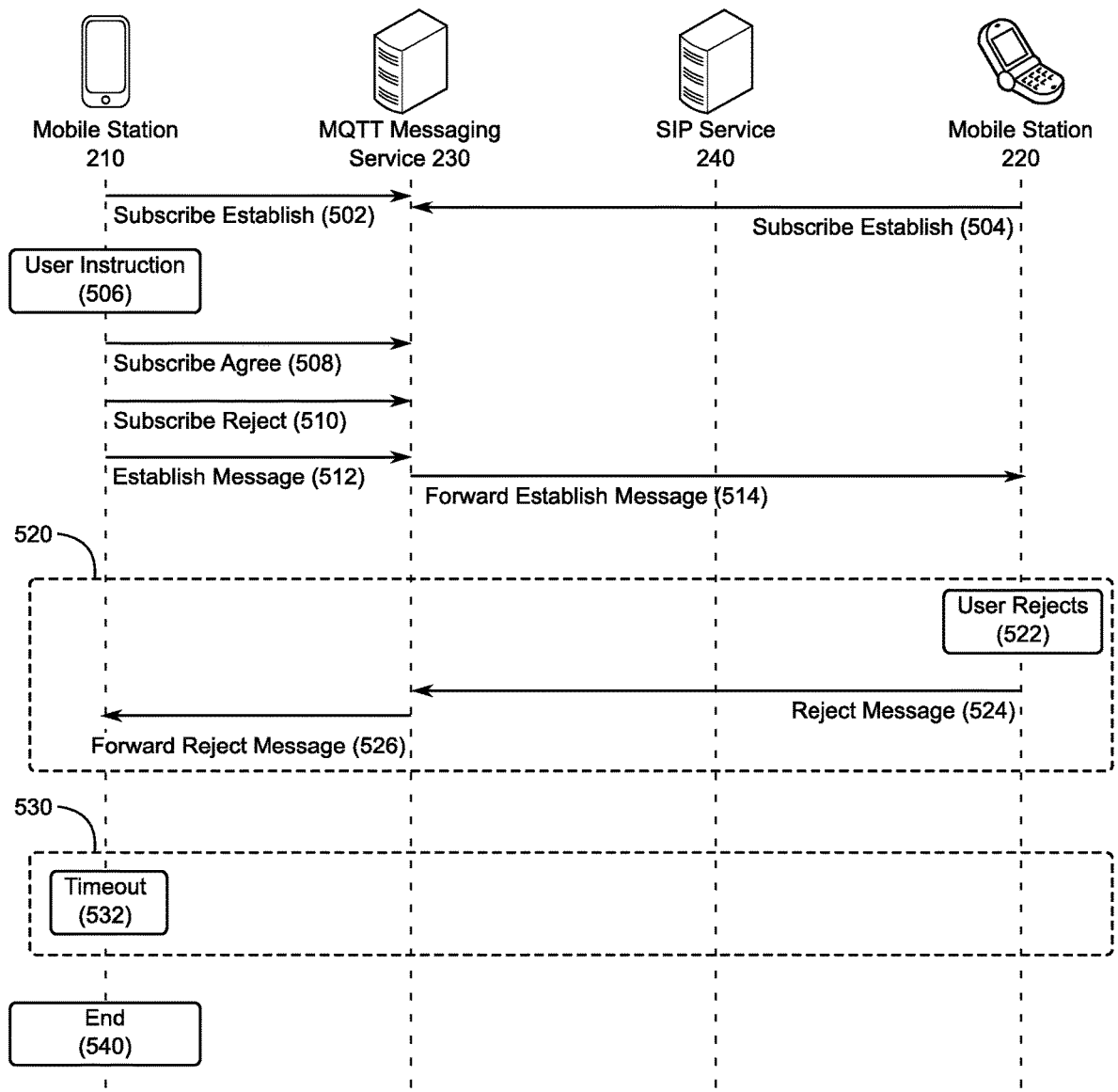
FIG. 5 illustrates an example in which a first mobile station requests to establish a media session with a second mobile station, but the request is rejected or times out.

FIG. 5 illustrates an example in which a first mobile station 210 requests to establish a media session with a second mobile station 220, but the request is rejected or times out. Operations 502, 504, 506, 508, and 512 by mobile station 210 and operation 514 by MQTT messaging service 230 proceed much as discussed with respect to respective operations 302, 304, 306, 308, 310, and 312 in FIG. 3. In some implementations, at 510, the mobile station 210 transmits a subscription request to MQTT messaging service 230 for a fourth topic name used to indicate a mobile station rejected establishing a media session with the mobile station 210. For example, the mobile station 210 may transmit an MQTT SUBSCRIBE packet to MQTT messaging service 230 for a first topic name "rejMS210"—a concatenation of a "rej" prefix with the "MS210" client identifier for mobile station 210. In some implementations, the fourth topic name may be specific to this particular attempt by mobile station 210 to establish a media session with mobile station 220. For example, the third topic name might be "MS210rejMS220" (which will be used hereafter as the example third topic name)—a concatenation of the "MS210" client identifier for mobile station 210, an "rej" string, and the "MS220" client identifier for mobile station 220.

520 and 530 illustrate alternative examples in which the request from mobile station 210 is rejected or times out. In the alternative 520, at 522, a user of mobile station 220 expressly instructs mobile station 220 to reject the requested media session with mobile station 210. In response to the instruction to reject the media session obtained at 522, mobile station 220 transmits an MQTT application message having the fourth topic name ("MS210rejMS220", in this example) to MQTT messaging service 230. For example, the mobile station 220 may transmit an MQTT PUBLISH packet to MQTT messaging service 230 indicating the fourth topic name "MS210rejMS220". Subsequent packets exchanged between mobile station 220 and MQTT messaging service 230 depend on the quality of service (QOS) level with which a particular implementation chooses to operate. At 526, MQTT messaging service 230 forwards the MQTT application message it received at 524 to mobile station 210 in response to the subscription by mobile station 210 at 510 for the fourth topic name ("MS210rejMS220", in this example). At this point, mobile station 210 has been notified that a mobile station (in some implementations, specifically mobile station 220) has rejected establishing a media session with mobile station 210.

In an alternative to using a fourth topic name as discussed for operations, 510, 524, and 526, mobile station 210 may omit operation 510, and mobile station 220 may instead transmit to MQTT messaging service 230 an MQTT application having the third topic name ("MS210agreeMS220", in this example), but with a payload that indicates that mobile station 220 has rejected the requested media session.

In the alternative 530, mobile station 210 does not receive an MQTT application message issued by mobile station 220 in response to the MQTT application message mobile station issued at 512 within a predetermined period of time, and as a result the attempted media session times out. This might occur due to a user of mobile station 220 ignoring or not otherwise responding to an indication that mobile station 210 issued the request, or due to various other circumstances involving mobile station 210, MQTT messaging service 230, mobile station 220, and/or any communication links they rely upon.

At 540, whether the request issued at 512 failed due to the request having been rejected, as in alternative 520, or the request timing out, as in alternative 530, the attempt to establish the media connection ends. In some implementations, an indication that the attempt failed may be provided to a user of mobile station 210 via mobile station 210.

The structure, programming and operations of the various types of mobile stations are well known. However, for completeness, it may be useful to consider the functional elements/aspects of two exemplary mobile stations 210 and 220, at a high level.

Figure 6A:
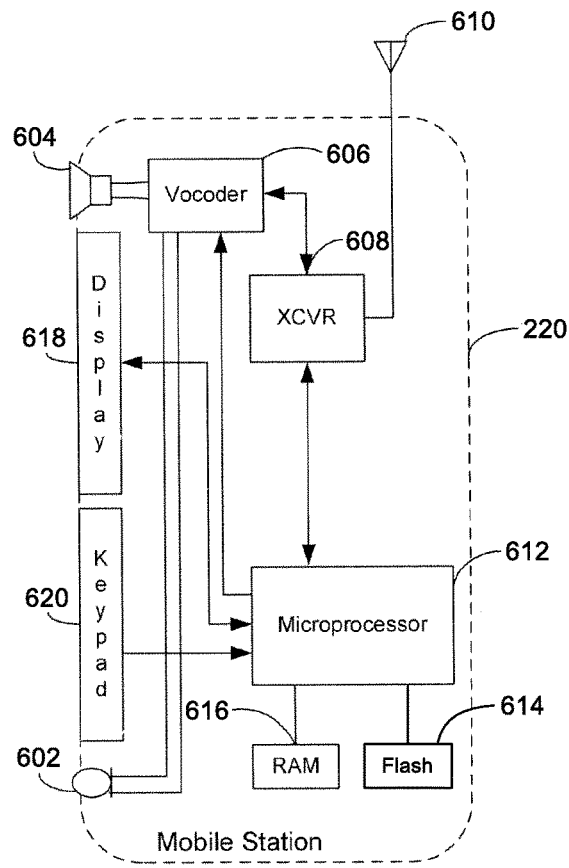
FIG. 6A is a high-level functional block diagram illustrating an example non-touch type mobile station that may utilize disclosed techniques through a mobile communication network.
Figure 6B:
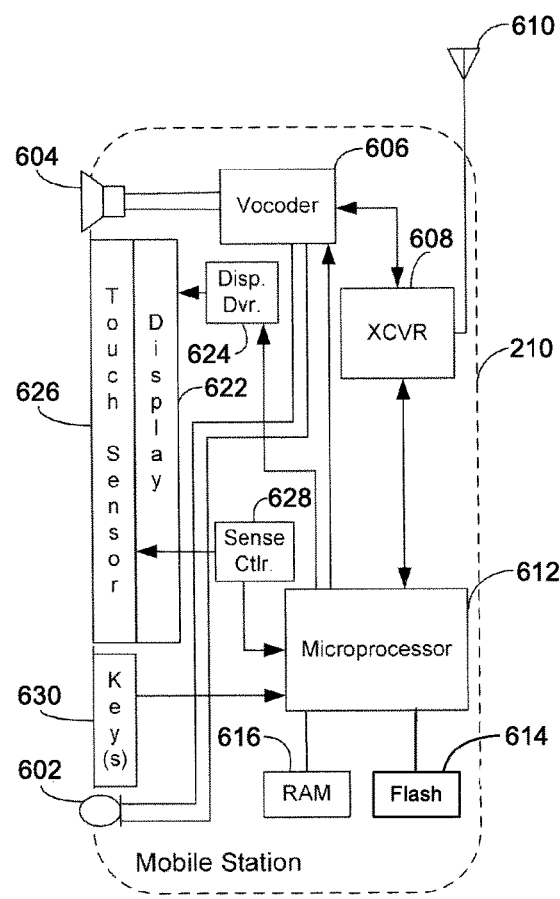
FIG. 6B is a high-level functional block diagram illustrating an example touch screen type mobile station that may utilize disclosed techniques through a mobile communication network.

For purposes of such a discussion, FIGS. 6A and 6B provide block diagram illustrations of an example non-touch type mobile station 220, and an example touchscreen type mobile station 210. For discussion purposes, the illustrations show the mobile stations 210 and 220 in the form of handsets. The handsets may be smart-phones or may be feature phones allowing at least some data communication capability.

The handset embodiment of the mobile station 220 functions as a normal digital wireless telephone station. For that function, the mobile station 220 includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 220 also includes at least one digital transceiver (XCVR) 608. Today, the handset 220 would be configured for digital wireless communications using one or more of the common network technology types. The concepts discussed here encompass embodiments of the mobile station 220 utilizing any digital transceivers that conform to current or future developed digital wireless communication standards. The mobile station 220 may also be capable of analog operation via a legacy network technology.

The transceiver 608 provides two-way wireless communication of information, such as vocoded speech samples and/or digital information, in accordance with the technology of a respective mobile communication network. The transceiver 608 also sends and receives a variety of signaling messages in support of the various voice and data services provided via the mobile station 220 and the communication network. Each transceiver 608 connects through RF send and receive amplifiers (not separately shown) to an antenna 610. The transceiver may also support various types of mobile messaging services (e.g., short message service (SMS)) and data services.

The mobile station 220 includes a display 618 for displaying messages, menus or the like, call related information dialed by the user, calling party numbers, etc., including data usage information for various data communications service over the mobile communication network. A keypad 620 enables dialing digits for voice and/or data calls as well as generating selection inputs, for example, as may be keyed-in by the user based on a displayed menu or as a cursor control and selection of a highlighted item on a displayed screen. The display 618 and keypad 620 are physical elements providing a textual or graphical user interface. Various combinations of the keypad 620, display 618, microphone 602, and speaker 604 may be used as physical input output elements of the graphical user interface (GUI), for multimedia (for example, audio and/or video) and data communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections related to resource usage metering.

A microprocessor 612 serves as a programmable controller for the mobile station 220, in that it controls operation of the mobile station 220 in accord with programming that it executes, for all normal operations, and for operations involved in obtaining accurate information relating to usage of data communication service over the mobile communication by the mobile station under consideration here. In the example, the mobile station 220 includes flash type program memory 614, for storage of various "software" or "firmware" program routines and mobile configuration settings, such as mobile directory number (MDN) and/or mobile identification number (MIN), etc. The mobile station 220 may also include a random access memory (RAM) 616 for a working data processing memory. Of course, other storage devices or configurations may be added to or substituted for those in the example. In a present implementation, the flash type program memory 614 stores firmware such as a boot routine, device driver software, an operating system, call processing software and vocoder control software, and any of a wide variety of other applications, such as client browser software, and short message service software.

The memories 614, 616 also store various data, such as telephone numbers and server addresses, downloaded data such as multimedia content, and various data input by the user. Programming stored in the flash type program memory 614, sometimes referred to as "firmware," is provided to and executed by the microprocessor 612.

As outlined above, the mobile station 220 includes a processor 612, and programming stored in the flash memory 614 which configures the processor 612 so that the mobile station 220 is capable of performing various desired functions, including in this case the functions involved in the technique for obtaining and updating real-time resource usage of a mobile communication network resource allocation associated with mobile station 220.

FIG. 6B provides a block diagram illustration of an example touch screen type mobile station 210. Some examples of touch screen type mobile station 210 include the Apple iPhone series of smartphone devices, which utilize the iOS operating system. Although possibly configured somewhat differently, at least logically, a number of the elements of the example touch screen type mobile station 210 are similar to the elements of mobile station 220, and are identified by like reference numbers in FIG. 6A. For example, the touch screen type mobile station 210 includes a microphone 602, speaker 604, and vocoder 606 for audio input and output functions, much as discussed above with respect to mobile station 220. The mobile station 210 also includes at least one digital transceiver (XCVR) 608, for digital wireless communications, although the handset 210 may include an additional digital or analog transceiver.

As in the mobile station 220, the transceiver 608 provides two-way wireless communication of information, such as vocoded speech samples and/or digital information, in accordance with the technology of the network 120. The transceiver 608 also sends and receives a variety of signaling messages in support of the various voice and data services provided via the mobile station 210 and a respective mobile communication network. Each transceiver 608 connects through RF send and receive amplifiers (not separately shown) to an antenna 610. The transceiver 608 may also support various types of mobile messaging services.

As in the example of mobile station 220, a microprocessor 612 serves as a programmable controller for the mobile station 210, in that it controls operations of the mobile station 210 in accord with programming that it executes, for all normal operations, and for operations involved in the procedure of obtaining and updating real-time resource usage by the mobile station 210 under consideration herein. In the example, the mobile station 210 includes flash type program memory 614, for storage of various program routines and mobile configuration settings. The mobile station 210 may also include a random access memory (RAM) 616 for a working data processing memory. Of course, other storage devices or configurations may be added to or substituted for those in the example. Hence, outlined above, the mobile station 210 includes a processor and programming. The programming stored in the flash memory 714 configures the processor of the mobile station to perform various desired functions, including in this case the functions discussed above for establishing media sessions.

In the example of FIG. 6A, the user interface elements include a display 618 and a keypad 620. The mobile station 210 may have a limited number of keys 630, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the example mobile station 210 includes a display 622, which the microprocessor 612 controls via a display driver 624, to present visible outputs to the user of the mobile station 210. The mobile station 210 also includes a touch/position sensor 626. The sensor 626 is relatively transparent, so that the user may view and interact with the information presented on the display 622. A sense circuit 628 senses signals from elements of the touch/position sensor 626 and detects occurrence and position of each touch of the screen formed by the display 622 and sensor 626. The sense circuit 628 provides touch position information to the microprocessor 612, which can correlate that information to the information currently displayed via the display 622, to determine the nature of user input via the screen.

The display 622 and touch sensor 626 (and possibly one or more keys 630, if included) are physical elements providing an interactive textual and graphical user interface for the mobile station 210. The microphone 602 and speaker 604 may be used as additional user interface elements, for audio input and output.

The structure and operation of the mobile stations 210 and 220, as outlined above, were described to by way of example, only.

As shown by the earlier discussion, functions relating to establishing media sessions between mobile stations may be implemented on computers connected for data communication via the components of a packet data network, operating as, for example, MQTT messaging service 230 and SIP service 240 illustrated in FIG. 2, in communication with each other and/or with the mobile stations 210 and 220. Although special purpose devices may be used, such devices also may be implemented using one or more hardware platforms intended to represent a general class of data processing device commonly used to run "server" programming so as to implement the functions discussed above, albeit with an appropriate network connection for data communication.

The software functionalities involve programming, including executable code as well as associated stored data. The software code is executable by the general-purpose computers that functions as the MQTT messaging service 230, SIP service 240, and/or the processors of mobile stations 210 and 220. In operation, the code is stored within the general-purpose computer platform or mobile station 210 or 220. At other times, however, the software may be stored at other locations and/or transported for loading into the appropriate general-purpose computer system or mobile station 210 or 220. Execution of such code by a processor of the computer platform and/or mobile station 210 or 220 enables the platform or mobile station 210 or 220 to implement the methodology for obtaining and updating current estimate amount of usage of data communication service by the mobile station, in essentially the manner performed in the implementations discussed and illustrated herein.

Figure 7:
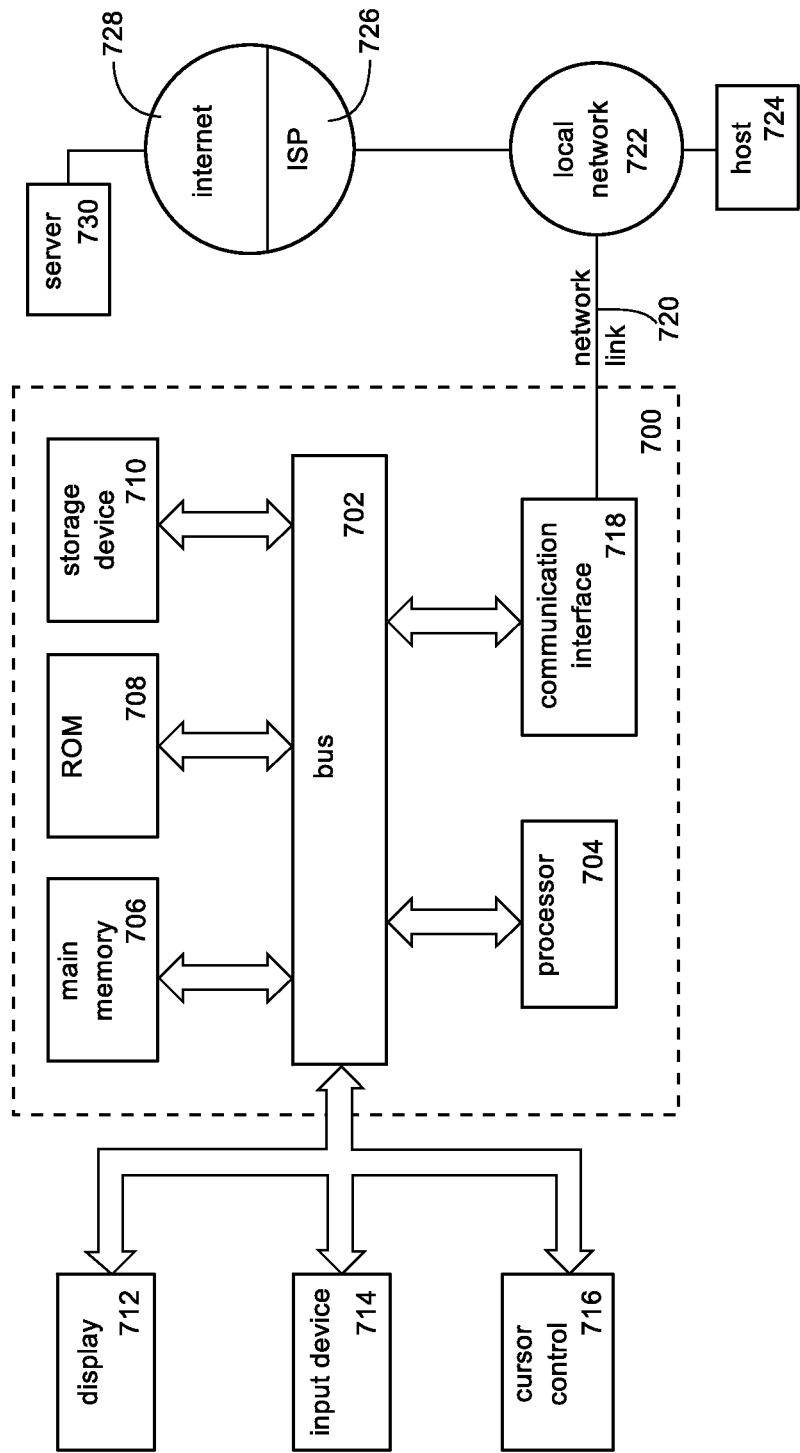
FIG. 7 is a block diagram that illustrates a computer system upon which aspects of this disclosure may be implemented

FIG. 7 is a block diagram that illustrates a computer system 700 upon which aspects of this disclosure may be implemented, such as, but not limited to MQTT messaging service 230, SIP service 240, and mobile stations 210 and 220. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Another type of user input device is a touchscreen, which generally combines display 712 with hardware that registers touches upon display 712.

This disclosure is related to the use of computer systems such as computer system 700 for implementing the techniques described herein. In some examples, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In some examples, hardwired circuitry may be used in place of or in combination with software instructions to implement the various aspects of this disclosure. Thus, implementations are not limited to any specific combination of hardware circuitry and software.

The term "machine-readable medium" as used herein refers to any medium that participates in providing data that causes a machine to operation in a specific fashion. In some examples implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electro-magnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   receiving, on a first mobile station, a first user instruction to establish a first media session with a second mobile station;
   transmitting to a Message Queuing Telemetry Transport (MQTT) messaging service, from the first mobile station, a first MQTT subscription request for a first topic name indicating the second mobile station agrees to establish the first media session with the first mobile station, wherein the first topic name is specific to agreement between the first and second mobile stations to establish the first media session;
   transmitting to the MQTT messaging service, from the first mobile station for forwarding to the second mobile station and in response to the first user instruction, a first MQTT application message having a second topic name requesting to establish the first media session with the second mobile station, wherein the second topic name is specific for the second mobile station;
   receiving, at the first mobile station and forwarded via the MQTT messaging service from the second mobile station, a second MQTT application message having the first topic name;
   determining, at the first mobile station and based on at least the received second MQTT application message, that the second mobile station agrees to establish the first media session with the first mobile station;
   establishing, in response to the determination that the second mobile station agrees to establish the first media session with the first mobile station, a first Session Initiation Protocol (SIP) channel with a SIP service;
   establishing, in response to the determination that the second mobile station agrees to establish the first media session with the first mobile station, a first SIP dialog between the first and second mobile stations via the first SIP channel; and
   conducting, in response to establishing the first SIP dialog, the first media session with the second mobile station.

2. The method of claim 1, wherein the establishing the first SIP dialog comprises:
   sending a SIP INVITE message to the second mobile station via the first SIP channel;
   receiving a SIP OK message, sent by the second mobile station, via the first SIP channel.

3. The method of claim 1, wherein the establishing the first SIP dialog comprises:
   receiving a SIP INVITE message, sent by the second mobile station, via the first SIP channel;
   sending, in response to the SIP INVITE message, a SIP OK message to the second mobile station, via the first SIP channel.

4. The method of claim 1, wherein the second MQTT application message is received by the first mobile station at a time that the first mobile station does not have a SIP channel established with the SIP service.

5. A non-transitory computer readable medium including instructions which, when executed by one or more processors included in the first mobile station, cause the one or more processors to perform the method of claim 1.

6. The method of claim 1, further comprising:
   transmitting to the MQTT messaging service, from the first mobile station, a second MQTT subscription request for a third topic name requesting to establish a second media session with the first mobile station;
   receiving, at the first mobile station and forwarded via the MQTT messaging service from a third mobile station, a third MQTT application message having the third topic name;
   determining, at the first mobile station and based on at least the received third MQTT application message, that the third mobile station requests to establish the second media session with the first mobile station;
   transmitting to the MQTT messaging service, from the first mobile station for forwarding to the third mobile station and in response to receiving the third MQTT application message, a fourth MQTT application message having a fourth topic name indicating the first mobile station agrees to establish the second media session with the third mobile station;
   establishing, in response to the determination that the third mobile station requests to establish the second media session with the first mobile station, a second SIP channel with the SIP service;
   establishing, in response to the determination that the third mobile station requests to establish the second media session with the first mobile station, a second SIP dialog between the first and third mobile stations via the second SIP channel; and
   conducting, in response to establishing the second SIP dialog, the second media session with the third mobile station.

7. The method of claim 6, further comprising:
   indicating, via the first mobile station and in response to receiving the third MQTT application message, to a user of the first mobile station that the third mobile station requests establishing the second media session with the first mobile station;
   receiving a second user instruction agreeing to establish the second media session requested via the third MQTT application message,
   wherein the fourth MQTT application message is transmitted in response to receiving the second user instruction, and
   the second SIP channel is established in response to receiving the second user instruction.

8. A non-transitory computer readable medium including instructions which, when executed by one or more processors included in the first mobile station, cause the one or more processors to perform the method of claim 6.

9. The method of claim 1, further comprising:
receiving, at the first mobile station, a push notification indicating that a mobile station requests to establish a media session with the first mobile station;
determining, at the first mobile station and based on at least the received push notification, that a third mobile station requests to establish a second media session with the first mobile station;
transmitting, from the first mobile station and in response to the determination that the third mobile station requests to establish the second media session with the first mobile station, a third MQTT application message having a third topic name agreeing to establish the second media session with the third mobile station;
establishing, in response to the determination that the third mobile station requests to establish the second media session with the first mobile station, a second SIP channel with the SIP service;
establishing, in response to the determination that the third mobile station requests to establish the second media session with the first mobile station, a second SIP dialog between the first and the third mobile stations via the second SIP channel; and
conducting, in response to establishing the second SIP dialog, the second media session with the third mobile station.

10. A non-transitory computer readable medium including instructions which, when executed by one or more processors included in the first mobile station, cause the one or more processors to perform the method of claim 9.

11. A method of establishing a first media session between a first mobile station and a second mobile station, the method comprising:
receiving, at a Message Queuing Telemetry Transport (MQTT) messaging service and from the first mobile station, a first MQTT subscription request for a first topic name indicating the second mobile station agrees to establish the first media session with the first mobile station, wherein the first topic name is specific to agreement between the first and second mobile stations to establish the first media session;
receiving, at the MQTT messaging service and from the first mobile station for forwarding to the second mobile station, a first MQTT application message having a second topic name requesting to establish the first media session with the second mobile station, wherein the second topic name is specific for the second mobile station;
issuing, in response to receiving the first MQTT application message, an indication to the second mobile station that the first mobile station requests establishing the first media session with the second mobile station;
receiving, at the MQTT messaging service and from the second mobile station, a second MQTT application message having the first topic name and indicating that the second mobile station agrees to establish the first media session with the first mobile station;
forwarding the second MQTT application message to the first mobile station;
receiving a Session Initiation Protocol (SIP) INVITE message issued by a third mobile station, wherein:
(a) the third mobile station is the first mobile station, and the SIP INVITE message is received in response to the forwarding of the second MQTT application message indicating that the second mobile station agrees to establish the first media session with the first mobile station, or
(b) the third mobile station is the second mobile station, and the SIP INVITE message is received in response to the issuing of the indication to the second mobile station that the first mobile station requests establishing the first media session with the second mobile station;
forwarding the SIP INVITE message to a fourth mobile station, the fourth mobile station being one of the first mobile station or the second mobile station and not the third mobile station;
receiving a SIP OK message issued by the fourth mobile station; and
forwarding the SIP OK message to the third mobile station.

12. The method of claim 11, further comprising:
receiving, at the MQTT messaging service and from the second mobile station, a second MQTT subscription request for the second topic name,
wherein the issuing the indication to the second mobile station includes forwarding the first MQTT application message to the second mobile station in response to receiving the second MQTT subscription request.

13. The method of claim 11, further comprising:
determining, in response to receiving the first MQTT application message, that the second mobile station does not have a connection established with the MQTT messaging service or is not subscribed with the MQTT messaging service for the second topic name,
wherein, in response to the determination that the second mobile station does not have the connection established with the MQTT messaging service or is not subscribed with the MQTT messaging service for the second topic name, the issuing the indication to the second mobile station includes issuing a push notification to the second mobile station indicating that the first mobile station requests establishing the first media session with the second mobile station.

14. The method of claim 11, further comprising:
establishing, after forwarding the second MQTT application message to the first mobile station, a first SIP channel between the first mobile station and a SIP proxy,
wherein either the SIP INVITE message or the SIP OK message is received from the first mobile station via the first SIP channel.

15. The method of claim 11, further comprising:
establishing, after issuing the indication to the second mobile station, a first SIP channel between the second mobile station and a SIP proxy,
wherein either the SIP INVITE message or the SIP OK message is received from the second mobile station via the first SIP channel.

16. The method of claim 12, further comprising:
authenticating or authorizing establishing the first media session between the first and second mobile stations via the MQTT messaging service and/or a SIP service that receives the SIP INVITE message or the SIP OK message.

17. One or more non-transitory computer readable mediums including instructions which, when executed by one or more processors, cause the one or more processors to perform the method of claim 11.

18. A system comprising:
a Message Queuing Telemetry Transport (MQTT) messaging service including one or more processors and a network communication interface;

one or more non-transitory computer readable mediums including a first plurality of instructions which, when executed by the MQTT messaging service, cause the MQTT messaging service to:
  receive, from a first mobile station, a first MQTT subscription request for a first topic name indicating a second mobile station agrees to establish a first media session with the first mobile station, wherein the first topic name is specific to agreement between the first and second mobile stations to establish the first media session,
  receive, from the first mobile station for forwarding to the second mobile station, a first MQTT application message having a second topic name requesting to establish the first media session with the second mobile station, wherein the second topic name is specific for the second mobile station,
  issue, in response to receiving the first MQTT application message, an indication to the second mobile station that the first mobile station requests establishing the first media session with the second mobile station,
  receive, from the second mobile station, a second MQTT application message having the first topic name and indicating that the second mobile station agrees to establish the first media session with the first mobile station, and
  forward the second MQTT application message to the first mobile station;
a Session Initiation Protocol (SIP) service including one or more processors and a network communication interface; and
one or more non-transitory computer readable mediums including a second plurality of instructions which, when executed by the SIP service, cause the SIP service to:
  receive a SIP INVITE message issued by a third mobile station, wherein:
    (a) the third mobile station is the first mobile station, and the SIP INVITE message is received in response to the forwarding of the second MQTT application message indicating that the second mobile station agrees to establish the first media session with the first mobile station, or
    (b) the third mobile station is the second mobile station, and the SIP INVITE message is received in response to the issuing of the indication to the second mobile station that the first mobile station requests establishing the first media session with the second mobile station,
  forward the SIP INVITE message to a fourth mobile station, the fourth mobile station being one of the first mobile station or the second mobile station and not the third mobile station,
  receive an SIP OK message issued by the fourth mobile station, and
  forward the SIP OK message to the third mobile station.

19. The system of claim 18, wherein:
the first plurality of instructions further cause the MQTT messaging service to receive, from the second mobile station, a second MQTT subscription request for the second topic name; and
the issuing the indication to the second mobile station includes forwarding the first MQTT application message to the second mobile station in response to receiving the second MQTT subscription request.

20. The system of claim 18, wherein:
the first plurality of instructions further cause the MQTT messaging service to determine, in response to receiving the first MQTT application message, that the second mobile station does not have a TCP connection established with the MQTT messaging service or is not subscribed with the MQTT messaging service for the second topic name; and
wherein, in response to the determination that the second mobile station does not have the TCP connection established with the MQTT messaging service or is not subscribed with the MQTT messaging service for the second topic name, the issuing the indication to the second mobile station includes issuing a push notification to the second mobile station indicating that the first mobile station requests to establish the first media session with the second mobile station.

\* \* \* \* \*